United States Patent [19]
McElderry

[11] Patent Number: 5,558,479
[45] Date of Patent: Sep. 24, 1996

[54] WALL ANCHOR ACCOMMODATING FASTENERS OF VARYING THREAD DIAMETERS

[75] Inventor: James W. McElderry, Schaumburg, Ill.

[73] Assignee: Illinois Tool Works Inc., Glenview, Ill.

[21] Appl. No.: 445,274

[22] Filed: May 19, 1995

[51] Int. Cl.⁶ .............................. F16B 25/00; F16B 37/12
[52] U.S. Cl. ............................ 411/178; 411/387; 411/437
[58] Field of Search .............................. 411/30, 31, 178, 411/387, 437, 180, 436

[56] References Cited

U.S. PATENT DOCUMENTS

| | | | |
|---|---|---|---|
| 4,322,194 | 3/1982 | Einhora | 411/30 |
| 4,500,238 | 2/1985 | Vassiliou | 411/30 |
| 4,601,625 | 7/1986 | Ernst et al. | 411/387 |
| 5,039,262 | 8/1991 | Giannuzzi | 411/30 |
| 5,160,225 | 11/1992 | Chern | 411/30 |
| 5,190,425 | 3/1993 | Wieder et al. | 411/387 |
| 5,234,299 | 8/1993 | Giannuzzi | 411/31 |
| 5,308,203 | 5/1994 | McSherry et al. | 411/31 |

*Primary Examiner*—Neill R. Wilson
*Attorney, Agent, or Firm*—Mark W. Croll; Thomas W. Buckman; John P. O'Brien

[57] ABSTRACT

A wall anchor uses splines on an interior surface of a cylindrical body to accommodate fasteners having different thread diameters. The splines are configured in types. A first type includes at least one spline protruding centrally at a narrow angle, while a second type also includes at least one spline protruding centrally at a wider angle. When a fastener, such as a #6 or #8 sheet metal screw (SMS), is inserted into the wall anchor, the first type of spline will primarily engage the #6 SMS, while the second type of splines are only partially implemented. When a #8 SMS, which has a larger thread diameter than a #6 SMS, is inserted into the wall anchor, both the first and second types of splines are engaged to facilitate retention of the SMS.

18 Claims, 2 Drawing Sheets

WALL ANCHOR ACCOMMODATING FASTENERS OF VARYING THREAD DIAMETERS

FIELD OF THE INVENTION

The present invention generally relates to wall anchors, and more specifically to wall anchors for use in a wall composed of friable material such as drywall or sheetrock.

BACKGROUND OF THE INVENTION

Wall anchors are known in the art. Generally, wall anchors take the form of either a friction-fit anchor, which is hammered into the wall, or a self-tapping anchor, which is screwed into the wall. These wall anchors find particular use in mounting articles, such as pictures or the like, to the wall. Wall anchors of this type are typically used in walls made of a friable material. The wall anchors are usually comprised of either a metal alloy, such as zinc, or a rigid plastic.

The friction-fit wall anchor is hammered into a pre-drilled hole in the wall by an installer, and usually consists basically of a cylindrical body configured to accept an elongated threaded fastener, and a flange to prevent the anchor from completely entering the wall. The flange also serves as an area where the required hammering force may be applied by the installer. Once inserted into the wall, a threaded fastener is engaged in the cylindrical body which causes the anchor to expand radially. Consequently, the friction-fit anchor is held in place by friction between the wall and the anchor.

The self-tapping anchor is screwed into the wall by an installer. The installer, through the use of an insertion device such as a manual or powered Phillips-head screwdriver, is able to quickly and easily insert the self-tapping anchor into the wall. Self-tapping anchors are primarily comprised of three separate components: a drilling portion which drills or bores a hole into the friable material, a threaded portion, which has a thread on a supporting cylindrical body that engages the friable material, and a flange which prevents the anchor from completely entering the wall. The flange also accepts the insertion device so that, upon turning the self-tapping anchor with the insertion device, the engaged thread draws the self-tapping anchor into the wall and becomes firmly mounted therein.

Prior art wall anchors implement splines on the cylindrical body of the wall anchor. The splines are disposed on an interior surface of the cylindrical body, extend generally longitudinally with respect to the body and engage an elongated threaded fastener, such as a sheet metal screw (SMS). Use of the splines allows the threaded fastener to be more easily inserted into the wall anchor due to the small amount of contact surface area between the threaded fastener and the splines. Since the material comprising the fastener is typically harder than the material comprising the wall anchor, the splines will also allow the threaded fastener to tap into the splines, which provides secure mounting of the article to be mounted.

The wide variety of available fasteners can change in both length of the fastener and the diameter of the threaded portion of the fastener. Since an installer of the wall anchor described above may have a need for the wide variety of fasteners offered, the installer must have a corresponding wide variety of wall anchors to accommodate the varying thread diameters of the fasteners. This in turn means that a manufacturer of wall anchors must provide a wide variety of wall anchors. However, carrying around a variety of wall anchors is cumbersome to the installer. Also, providing the corresponding variety of wall anchors by the manufacturer is likewise burdensome. For example, a different die must be designed and manufactured for each size of fastener to be accommodated. The making of separate dies for different size fasteners is not only expensive to the manufacturer of the wall anchor, but also adds to the number of different parts that must be inventoried, tracked, and eventually sold by the manufacturer.

Thus, a need exists for a wall anchor which accommodates fasteners having varying thread diameters.

SUMMARY OF THE INVENTION

It is therefore an object of the present invention to provide an improved wall anchor which accommodates fasteners of varying thread diameters.

Another object of the present invention is to provide an improved wall anchor which incorporates a spline configuration for accommodating fasteners of varying thread diameters.

Still another object of the present invention is to provide an improved wall anchor having at least two sets of splines so that at least one of the sets of splines engages a fastener having a first thread diameter and both sets of splines engage a fastener having a second, larger thread diameter.

The above listed objects are met or exceeded by the present wall anchor, which includes a spline configuration having a first and second set of splines. The spline configuration accommodates fasteners having varying thread diameters in accordance with the invention.

More specifically, the present wall anchor finds use in mounting articles upon a wall, or the like, composed of a friable material such as drywall or sheetrock. The articles are mounted in the friable material by fasteners having threads of specified diameters. Included on the anchor is a flange which prevents the wall anchor from completely entering the wall upon insertion and a generally cylindrical body which has a flange end and an interior surface. The body is coupled to the flange at the flange end. An interior surface of the body is defined by a bore which has a predetermined diameter $D_1$. A spline configuration, which is disposed on the interior surface is configured to accommodate at least two diameter-specific fastener sizes.

In an alternate embodiment, the present wall anchor is a self-tapping anchor for use in a friable material. Included on the anchor is a flange having notches for accepting an insertion device, and a cylindrical body having a flange end, an interior surface and an exterior surface. Coupled to the cylindrical body is the flange at the flange end. An interior surface of the cylindrical body is defined by a bore, also having a predetermined diameter $D_1$, and a spline configuration disposed on the interior surface of the cylindrical body. The spline configuration is configured to accommodate fasteners having at least one of a first and a second diameter. An exterior surface of the cylindrical body has a thread disposed thereon.

The self-tapping anchor described above also preferably includes a drilling portion, which is coupled to an end of the cylindrical body opposite of the flange end. The drilling portion cuts the friable material to allow the thread to engage the friable material.

DETAILED DESCRIPTION OF THE PREFERRED EMBODIMENT

Figure 1:
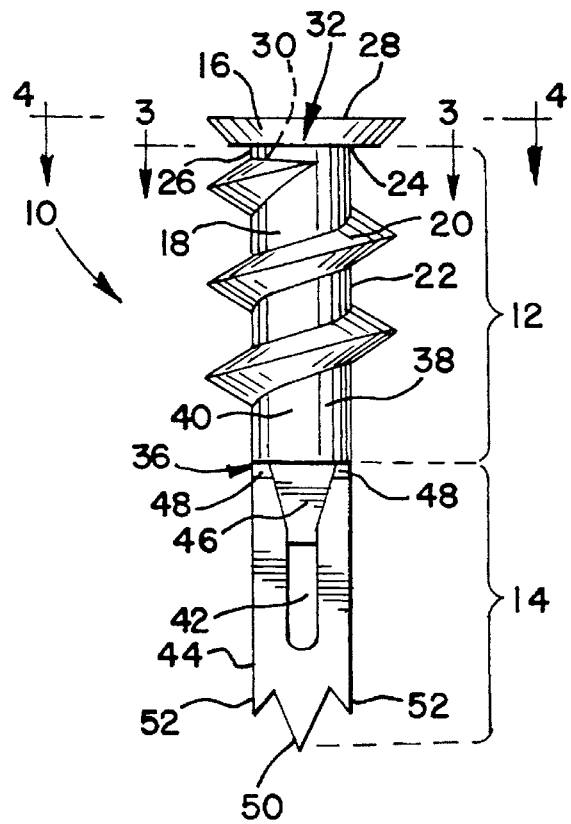
FIG. 1 is a front elevational view of a first embodiment of a wall anchor constructed in accordance with the present invention.

Referring now to FIG. 1, a wall anchor for accommodating fasteners of varying diameters in accordance with the invention is generally designated 10. In the preferred embodiment, the wall anchor 10 is a self-tapping anchor, but other types of wall anchors, including friction-fit anchors, are contemplated. A main feature of the wall anchor 10 is that it uses a spline configuration disposed on an interior surface of a cylindrical body to accommodate fasteners having varying thread diameters. In the preferred embodiment, the wall anchor 10 is comprised of zinc, however other metal alloys having properties similar to zinc are contemplated. Rigid, moldable plastic may likewise be beneficially employed for the present anchor.

The wall anchor 10 includes a threaded portion 12, a drilling portion 14 and a flange 16. Included on the threaded portion 12 is a cylindrical body 18 having a thread 20 disposed on an exterior surface 22 of the cylindrical body. The flange 16 is coupled to the cylindrical body 18 at a flange end 24 of the cylindrical body. The flange 16 is linearly displaced from the thread 20 by a space 26 and has a fastener engaging surface 28.

The cylindrical body 18 also includes an interior surface 30 defined by a bore 32. The bore 32 extends the length of the cylindrical body 18, from the surface 28 on the flange 16 to a juncture 36. In the preferred embodiment, pairs of opposed splines 38, 40 (best seen in FIG. 4) also extend the length of the cylindrical body 18. In alternate embodiments, the length of the splines 38, 40 may vary depending on the application.

Coupled to the threaded portion 12 at the juncture 36 is the drilling portion 14. The drilling portion 14 includes a blade 44 which has a cupped area 46 in communication with the bore 32 of the cylindrical body 18. The blade 44 also includes, at or substantially near the juncture 36, break-away or weakening points 48 which weaken the coupling between the threaded portion 12 and the drilling portion 14. Weakening points 48 provide a reduced surface area so that the drilling portion 14 is snapped-off when a fastener is inserted into the bore 32 of the cylindrical body 18.

Figure 2:
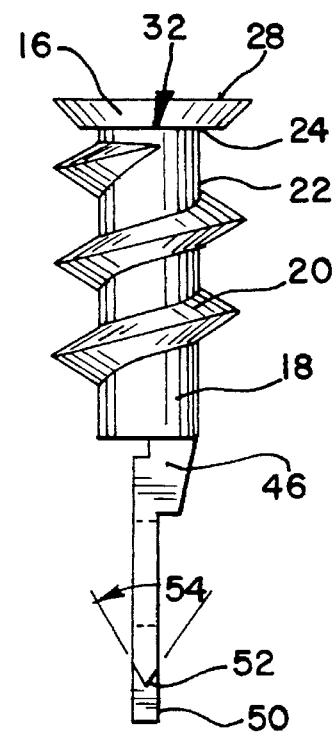
FIG. 2 is a side elevational view of the wall anchor shown in FIG.1 taken from the right side of FIG. 1.

In the preferred embodiment, the blade 44 also includes a central spike 50 disposed between a pair of lateral spikes 52. The central spike 50 is longer than the lateral spikes 52, and provides an initial point of contact upon insertion of the wall anchor 10 into the wall. Upon initial insertion, and turning of the wall anchor 10 by an insertion device, such as a Phillips-head screwdriver (not shown), the lateral spikes 52 cut or bore a hole into the wall. As best seen in FIG. 2, the lateral spikes 52 are beveled at an angle 54. In the preferred embodiment, the angle 54 is approximately 90°, however, other angles are contemplated depending on the application. The blade 44 also includes an open area 42, which serves to reduce the overall weight of the wall anchor 10.

Figure 3:
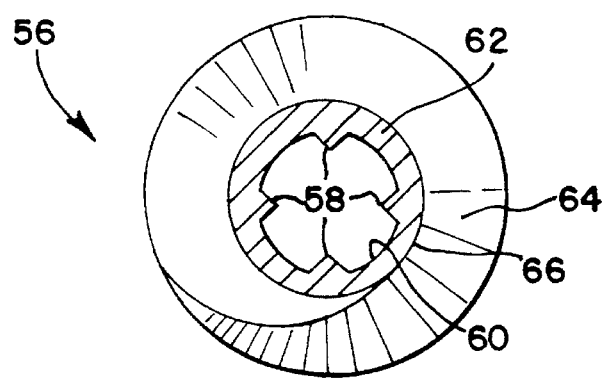
FIG. 3 is a sectional view of a prior art wall anchor that would be taken along the line 3—3 of FIG. 1 in the direction generally indicated.

A sectional view of a prior art self-tapping anchor is depicted in FIG. 3 and is generally designated 56. This view depicts four splines 58 disposed on an interior surface 60 of a cylindrical body 62. A thread 64 is disposed on an exterior surface 66 of the cylindrical body 62. In the self-tapping anchor 56 each spline 58 has substantially the same dimension and configuration. Consequently, the anchor 56 may only accommodate a single size (diameter) fastener, such as a sheet metal screw (SMS).

Figure 4:
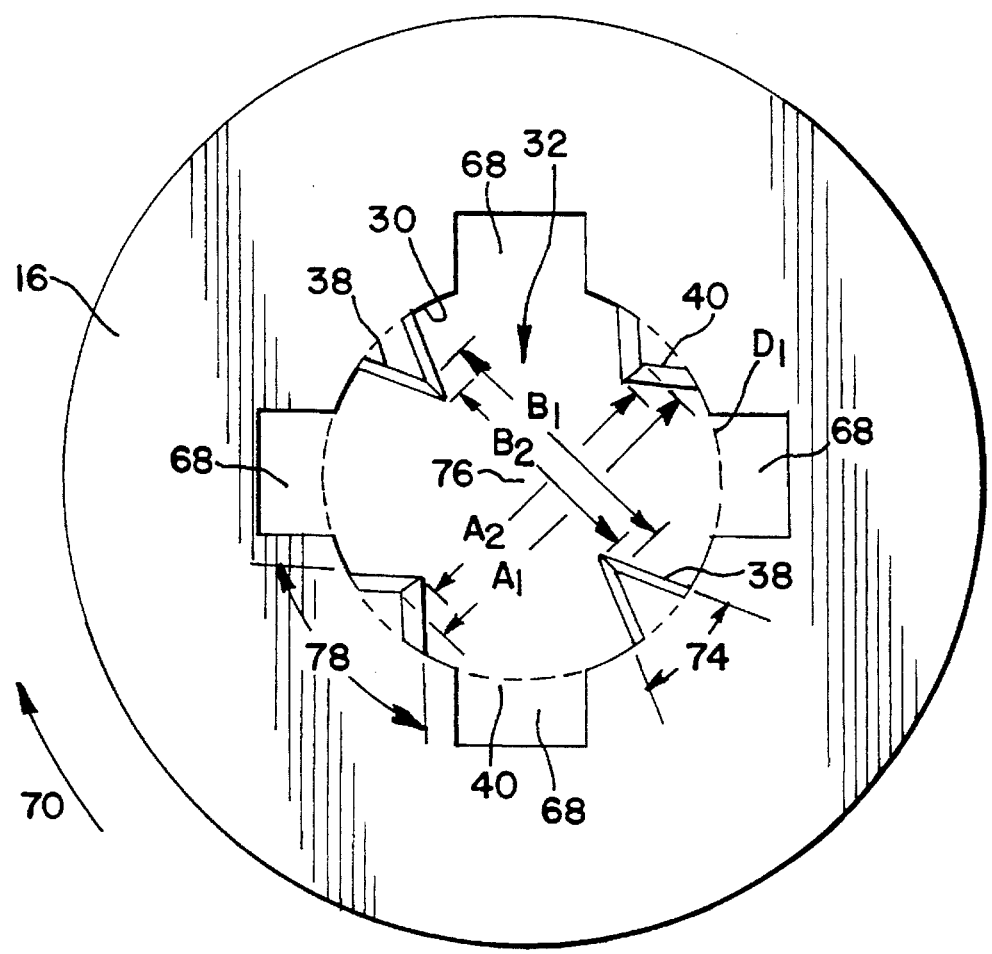
FIG. 4 is an end view of the wall anchor of FIG. 1 taken along the line 4—4 of FIG. 1 in the direction generally indicated.

Referring now to FIG. 4, the flange 16 includes four notches 68, each disposed around the surface 28 of the flange 16 approximately 90° degrees from one another. Each of the notches 68 are generally rectangular in shape. The notches 68 are configured so that they accept an insertion device, such as manual or powered Phillips-head screwdriver. However, it is contemplated that the notches 68 may be configured to accommodate any type of conventional driving tool, including, but not limited to Allen-type, Tor-x® type or even slotted screwdrivers. The insertion device allows an installer to rotate the wall anchor 10 in a clockwise direction (as shown by the arrow 70) so that the wall anchor 10 may be inserted into the wall. Rotating the wall anchor 10 in a counter-clockwise direction allows for removal of the wall anchor 10 from the wall.

The generally cylindrical interior surface 30 defined by the bore 32 defines a circle having a predetermined diameter $D_1$ which remains constant throughout the length of the cylindrical body 18, i.e., from the surface 28 to the juncture 36.

Figure 5:
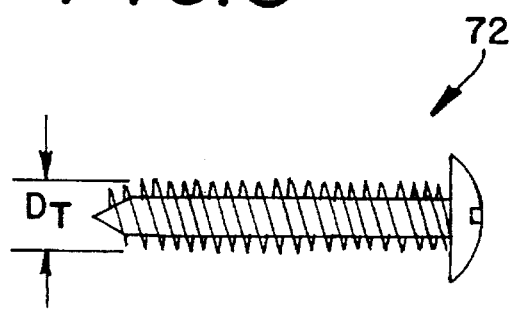
FIG. 5 is a side elevational view of a fastener which may be inserted in the wall anchor of FIG. 1.

In FIG. 4, the preferred embodiment of the present spline configuration is depicted, which, when implemented in the wall anchor 10 of FIG. 1, accommodates fasteners of varying thread diameters in accordance with the invention. The preferred embodiment spline configuration depicted in FIG. 4 is configured to accommodate either a standard #6 SMS or a standard #8 SMS having a larger thread diameter than the #6 SMS. A typical fastener having a thread diameter $D_T$ is shown in FIG. 5 and is generally designated 72.

In the preferred embodiment, respective pairs of the opposed splines 38 and 40 are diametrically opposed to one another, however other numbers and positions of the splines are contemplated. For example, it is contemplated that an anchor 10 may include a single spline 38 and a pair of splines 40, and vice versa. Structurally speaking, the splines 38 and 40 are both characterized generally by, inter alia, their triangular cross-section, the angle of their protrusion towards a center 76 of the bore 32, and their height, or the distance of their protrusion from the interior surface 30 towards the center. A feature of the preferred embodiment is that the pair of splines 38 is configured to engage a #6 SMS, and the pair of splines 40 is configured to engage a #8 SMS.

With reference to the splines 38, the angle 74 of protrusion of the splines 38 is approximately 45°, although other angles are contemplated depending on the application. The distance to which the splines 38 protrude from the interior surface 30 towards the center 76 of the bore 32 is best characterized by the tip-to-tip distance between opposing pairs of the splines 38. An important attribute of the splines 38 is that they taper along the length of the cylindrical body 18 to protrude progressively further towards the center 76 as one reaches the juncture 36. Consequently, the distance $A_1$ at the surface 28 is larger than the corresponding distance $A_2$ at the juncture 36 of the cylindrical body 18. In the preferred embodiment, the distance $A_1$ between the splines 38 is 0.136 inch, while the distance $A_2$ at the juncture 36 is 0.126 inch. Other angles are contemplated depending on the application.

The reason the splines 38 are tapered is as follows. The primary objective of the splines 38 is to engage a threaded fastener such as a #6 SMS. Since the wall anchor 10 is made of zinc, a material which is softer than the #6 SMS, the splines 38 will be "tapped" or locally displaced by the threads of the #6 SMS. For ease of insertion of the #6 SMS into the wall anchor 10, it is desired that the interior surface 30 be dimensioned to accommodate the insertion of the #6 SMS into the bore 32 without first engaging either of the splines 38. By allowing the distance $A_1$ at the surface 28 of the flange 16 to be slightly larger than the thread diameter of the #6 SMS, and tapering the splines 38 along the length of the cylindrical body 18, the #6 SMS can be easily placed into the bore 32 of the wall anchor 10 by hand. Upon insertion, the #6 SMS will be held in place by the force of the splines 38 at a point where the distance $A_2$ is approximately equal to the thread diameter of the #6 SMS.

When the #6 SMS is subsequently screwed into the wall anchor 10 using an insertion device, the threads of the #6 SMS will engage the splines 38 and thread itself firmly into the softer zinc of the splines. In this manner, firm mounting utilizing a #6 SMS can be achieved with the wall anchor 10 depicted in FIGS. 1, 2 and 4 in accordance with the invention.

The spline configuration depicted in FIG. 4 also includes the splines 40. As is the case with the splines 38, each of the splines 40 are substantially identical to each other. In the preferred embodiment, the splines 40 are also diametrically opposed to one another, but other relative positions are contemplated.

In the preferred embodiment, the angle 78 to which the splines 40 protrude is 100°, although other angles are contemplated depending on the application. The distance to which the splines 40 protrude from the interior surface 30 towards the center 76 of the bore 32 is characterized by the tip-to-tip distance between the splines.

As was the case with the splines 38, the splines 40 are tapered along the length of the cylindrical body 18 such that the distance $B_1$ at the surface 28 is larger than the corresponding distance $B_2$ at the juncture 36 of the cylindrical body. In the preferred embodiment, the distance $B_1$ at the surface 28 is 0.159 inch, while the distance $B_2$ at the juncture 36 is 0.140 inch. Other angles are contemplated depending on the application. Thus, in the preferred embodiment, the splines 38 have a smaller angle of protrusion, and a larger distance of protrusion than the splines 40.

Upon insertion and rotation of a #8 SMS, which has a slightly larger thread diameter than a #6 SMS, into the bore 32, the threads of the SMS will tap or displace the zinc of the splines. The #8 SMS will engage not only the splines 38 but also the splines 40. Consequently, all four splines 38, 40 will be threaded by the #8 SMS. By contrast, only splines 38 are threaded when #6 SMS is inserted into the bore 32. By implementing the spline configuration described above, fasteners having varying thread diameters, such as a #6 SMS and a #8 SMS, can be utilized in a single wall anchor 10 in accordance with the invention.

As one of ordinary skill in the art will appreciate, modifications and variations may be made to the wall anchor herein described which accommodates fasteners of varying thread diameters without departing from the scope and spirit of the invention. Various features of the present invention as described in relation to the various embodiments are set forth in the following claims. The disclosure is intended to cover, by the appended claims, all such modifications and variations that fall within the scope of the claims.

What is claimed is:

1. An anchor for use in mounting articles upon a friable material by means of fasteners having threads of specified diameters, comprising:

a flange for preventing the anchor from completely entering the friable material; and a generally cylindrical body having a flange end and a generally cylindrical interior surface, said body coupled to said flange at said flange end, said interior surface of said body defined by a bore having a predetermined diameter and a center, said interior surface having a spline configuration disposed thereon, said spline configuration configured to accommodate at least two diameter-specific fastener sizes, said spline configuration including a first type of spline and a second type of spline, both said types of splines having a height measured from said generally cylindrical interior surface and extending radially towards said center, said second type of spline having a height which is greater than said height of said first type of spline.

2. The anchor of claim 1, wherein said spline configuration further comprises at least one of a first type of spline and at least one of a second type of spline, each said type of spline having substantially identical characteristics with respect to other splines of that type, if any.

3. The anchor of claim 2, wherein said first and second types of at least one spline each further comprise two splines diametrically opposed to one another.

4. The anchor of claim 2, wherein said characteristics further comprise at least an angle of protrusion of said first and second types of splines toward said center of said bore.

5. The anchor of claim 2, wherein said characteristics of said first type of splines are different from said characteristics of said second type of splines.

6. The anchor of claim 5, wherein said angle of protrusion of said first type of spline is greater than said angle of protrusion of said second type of spline.

7. The anchor of claim 1, wherein said splines substantially begin at said flange end.

8. The anchor of claim 1, wherein said splines are tapered along a length of said cylindrical body.

9. A self-tapping anchor for use in a friable material by means of fasteners having threads of specified diameters, comprising:

a flange for preventing the anchor from completely entering the friable material; and a cylindrical body having a flange end, an interior surface and an exterior surface, said cylindrical body coupled to said flange at said flange end, said interior surface of said cylindrical body defined by a bore having a predetermined diameter and a spline configuration disposed on said interior surface of said cylindrical body, said spline configuration configured to accommodate fasteners having at least one of a first and second diameter, said exterior surface of said cylindrical body having a thread disposed thereon;

said spline configuration including first and second types of splines, each said type having an angle of protrusion of said splines toward a center of said bore, said angle of protrusion of said first type of spline is greater than said angle of protrusion of said second type of spline.

10. The self-tapping anchor of claim 9 further comprising a drilling portion, coupled to an end opposite of said end coupled to said flange, for cutting the friable material to allow said thread to engage the friable material.

11. The self-tapping anchor of claim 9, wherein said spline configuration further comprises at least one of said first type of spline and at least one of said second type of spline, each said type of spline having substantially identical characteristics with respect to other splines of that type.

12. The self-tapping anchor of claim 11, wherein said first and second types of splines each further comprise two splines diametrically opposed to one another.

13. The self-tapping anchor of claim 11, wherein said characteristics further comprise at least a distance of protrusion of said first and second types of splines toward said center of said bore, said distance of protrusion of said first type of spline being less than said distance of protrusion of said second type of spline.

14. The self-tapping anchor of claim 11, wherein said characteristics for said first types of splines are different from said characteristics for said second types of splines.

15. The self-tapping anchor of claim 9, wherein said splines substantially begin at said flange end.

16. The self-tapping anchor of claim 9, wherein said splines are tapered along a length of the cylindrical body.

17. An anchor for use in mounting articles upon a friable material by means of fasteners having threads of specified diameters, comprising:

a flange for preventing the anchor from completely entering the friable material; and a generally cylindrical body having a flange end and an interior surface, said body coupled to said flange at said flange end, said interior surface of said body defined by a bore having a predetermined diameter, said interior surface having a spline configuration disposed thereon, said spline configuration including at least one type of spline configured to accommodate at least two diameter-specific fastener sizes, said splines being tapered along a length of said cylindrical body.

18. An anchor for use in mounting articles upon a friable material by means of fasteners having threads of specified diameters, comprising:

a flange for preventing the anchor from completely entering the friable material; and a generally cylindrical body having a flange end and an interior surface, said body coupled to said flange at said flange end, said interior surface of said body defined by a bore having a predetermined diameter, said interior surface having a spline configuration disposed thereon, said spline configuration configured to accommodate at least two diameter-specific fastener sizes, said spline configuration including a pair of a first type of spline and a pair of a second type of spline, all of said splines projecting from said interior surface toward a center of said bore, each of said first type of splines being diametrically opposed to each other, and each of said second type of splines being diametrically opposed to each other, said splines of said second type having a distance of protrusion toward said center which is greater than a distance of protrusion of said first type of splines.

* * * * *

UNITED STATES PATENT AND TRADEMARK OFFICE
CERTIFICATE OF CORRECTION

PATENT NO. : 5,558,479
DATED : September 24, 1996
INVENTOR(S) : James W. McElderry It is certified that error appears in the above-indentified patent and that said Letters Patent is hereby corrected as shown below:

Column 4, line 67, delete "$A_1$" and insert --$B_1$--;

Column 5, line 1, delete "$A_2$" and insert --$B_2$--;

Column 5, line 3, delete "$A_1$" and insert --$B_1$--;

Column 5, line 4, delete "$A_2$" and insert --$B_2$--;

Column 5, line 15, delete "$A_1$" and insert --$B_1$--;

Column 5, line 21, delete "$A_2$" and insert --$B_2$--;

Column 5, line 44, delete "$B_1$" and insert --$A_1$--;

Column 5, line 45, delete "$B_2$" and insert --$A_2$--;

UNITED STATES PATENT AND TRADEMARK OFFICE
CERTIFICATE OF CORRECTION

PATENT NO. : 5,558,479
DATED : September 24, 1996
INVENTOR(S) : James W. McElderry It is certified that error appears in the above-indentified patent and that said Letters Patent is hereby corrected as shown below:

Column 5, line 46, delete "$B_1$" and insert --$A_1$--;

Column 5, line 47, delete "$B_2$" and insert --$A_2$--.

Signed and Sealed this

Thirteenth Day of May, 1997

*Attest:*

BRUCE LEHMAN

*Attesting Officer*  *Commissioner of Patents and Trademarks*